Aug. 10, 1965 J. P. KELLEY 3,200,394
PLURAL BELT DISPLAY UNIT HAVING BALL DETENT
CONTROL OF BELT POSITION
Filed July 25, 1962 5 Sheets-Sheet 2
FIG. 4
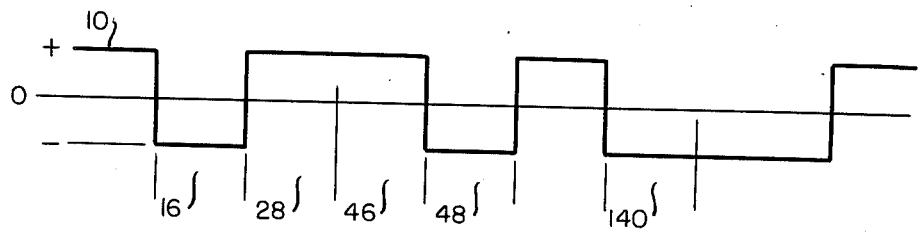
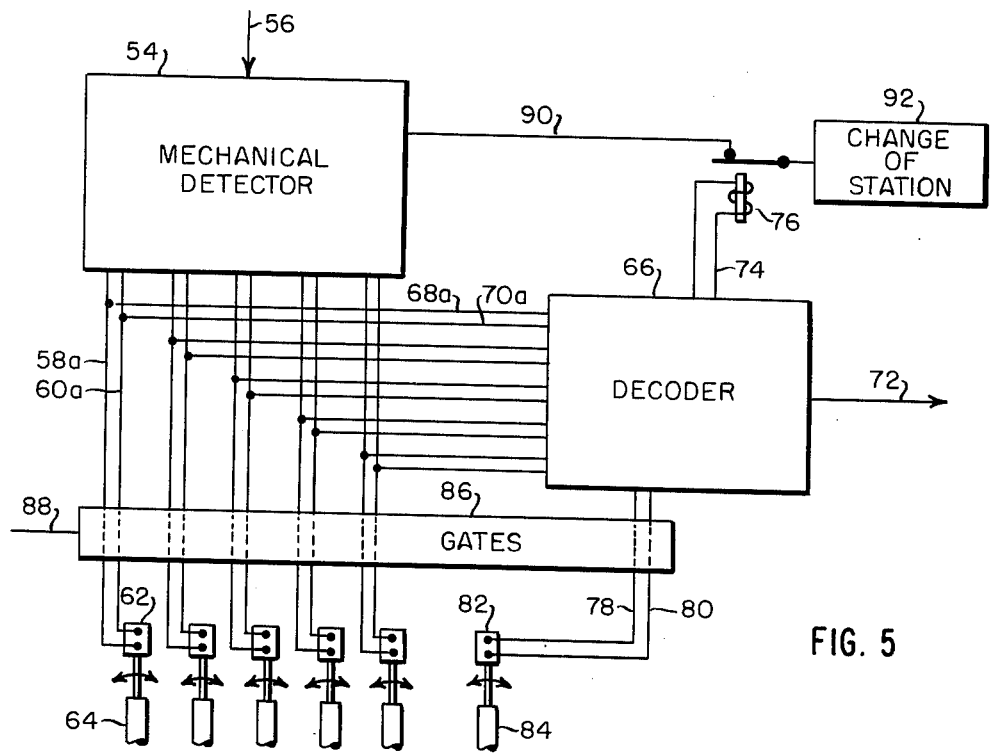
FIG. 5
INVENTOR.
JOSEPH P. KELLEY
BY
ATTORNEYS Aug. 10, 1965
J. P. KELLEY
3,200,394
PLURAL BELT DISPLAY UNIT HAVING BALL DETENT
CONTROL OF BELT POSITION
Filed July 25, 1962
5 Sheets-Sheet 3
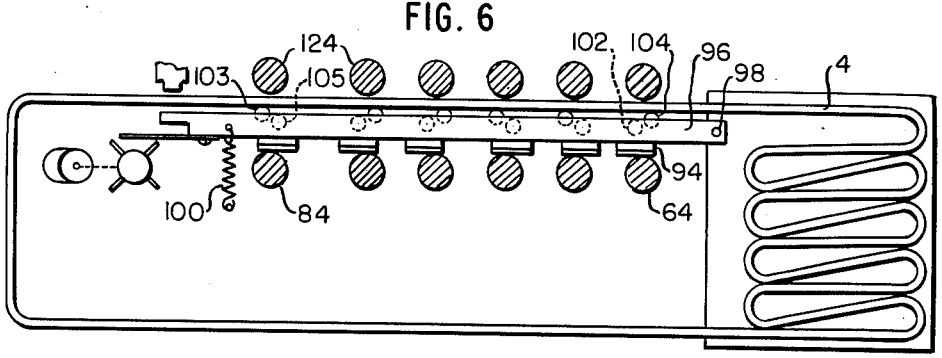
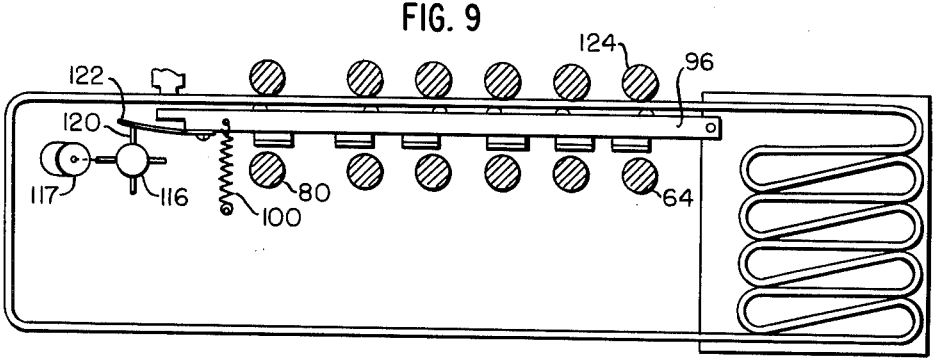
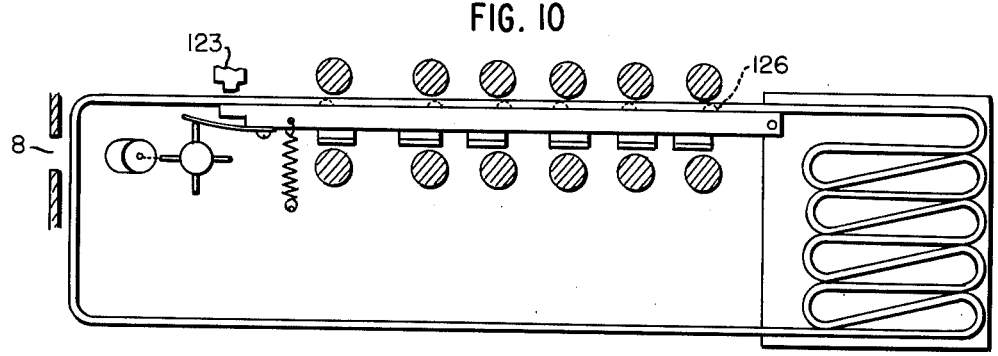
INVENTOR.
JOSEPH P. KELLEY
BY
*Kenway, Jenney & Hildreth*
ATTORNEYS Aug. 10, 1965   J. P. KELLEY   3,200,394
PLURAL BELT DISPLAY UNIT HAVING BALL DETENT
CONTROL OF BELT POSITION
Filed July 25, 1962   5 Sheets-Sheet 4
FIG. 7
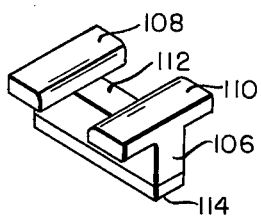
FIG. 8
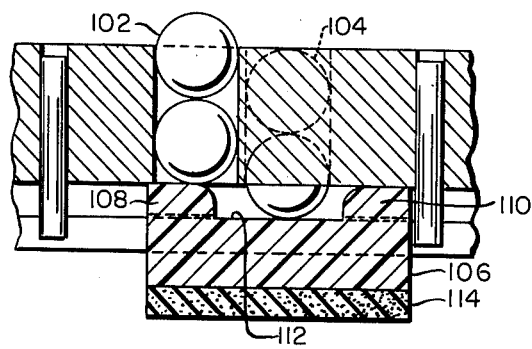
FIG. 11
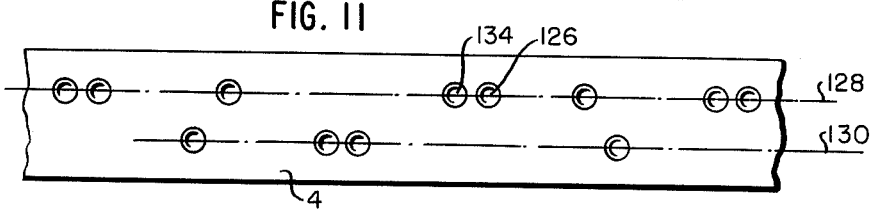
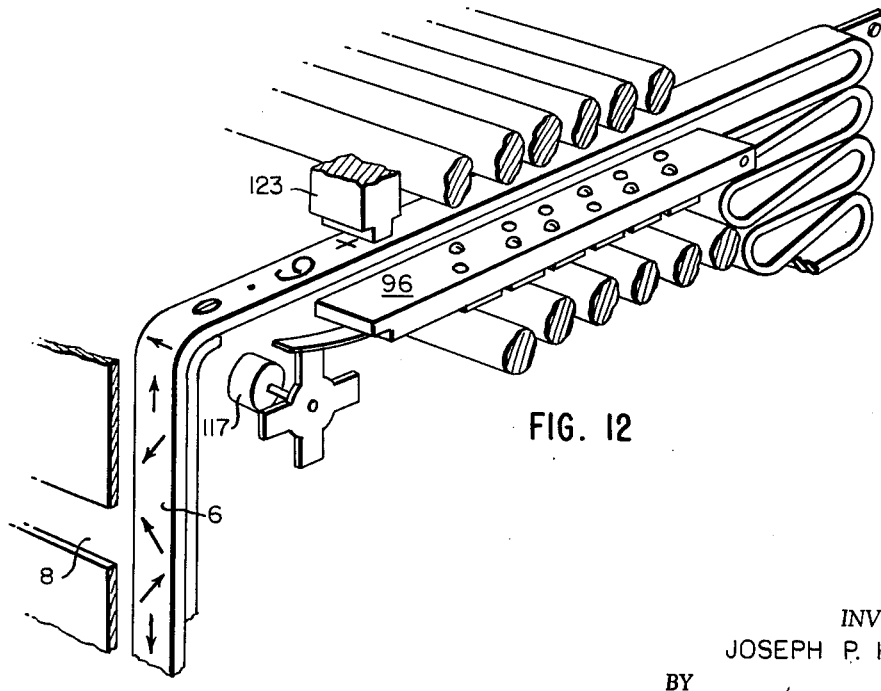
FIG. 12
INVENTOR.
JOSEPH P. KELLEY
BY
Kenway, Jenney & Hildreth
ATTORNEYS Aug. 10, 1965 J. P. KELLEY 3,200,394
PLURAL BELT DISPLAY UNIT HAVING BALL DETENT
CONTROL OF BELT POSITION
Filed July 25, 1962 5 Sheets-Sheet 5
FIG. 13
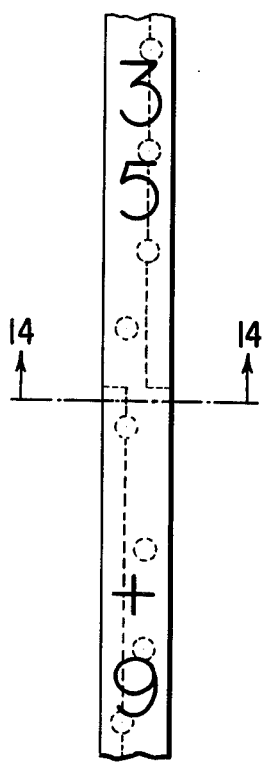
FIG. 15
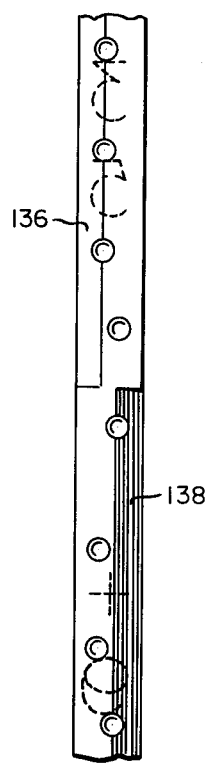
FIG. 16
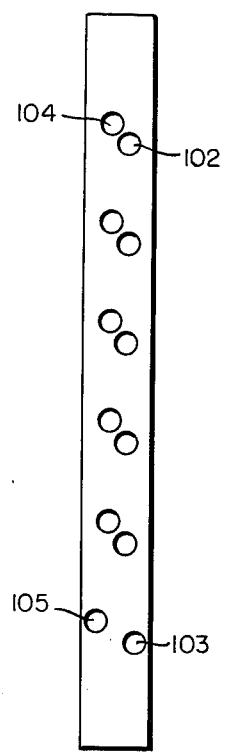
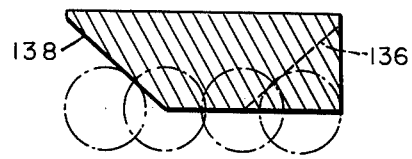
FIG. 14
INVENTOR.
JOSEPH P. KELLEY
BY Kenway, Jenney + Hildreth
ATTORNEYS United States Patent Office 3,200,394
Patented Aug. 10, 1965

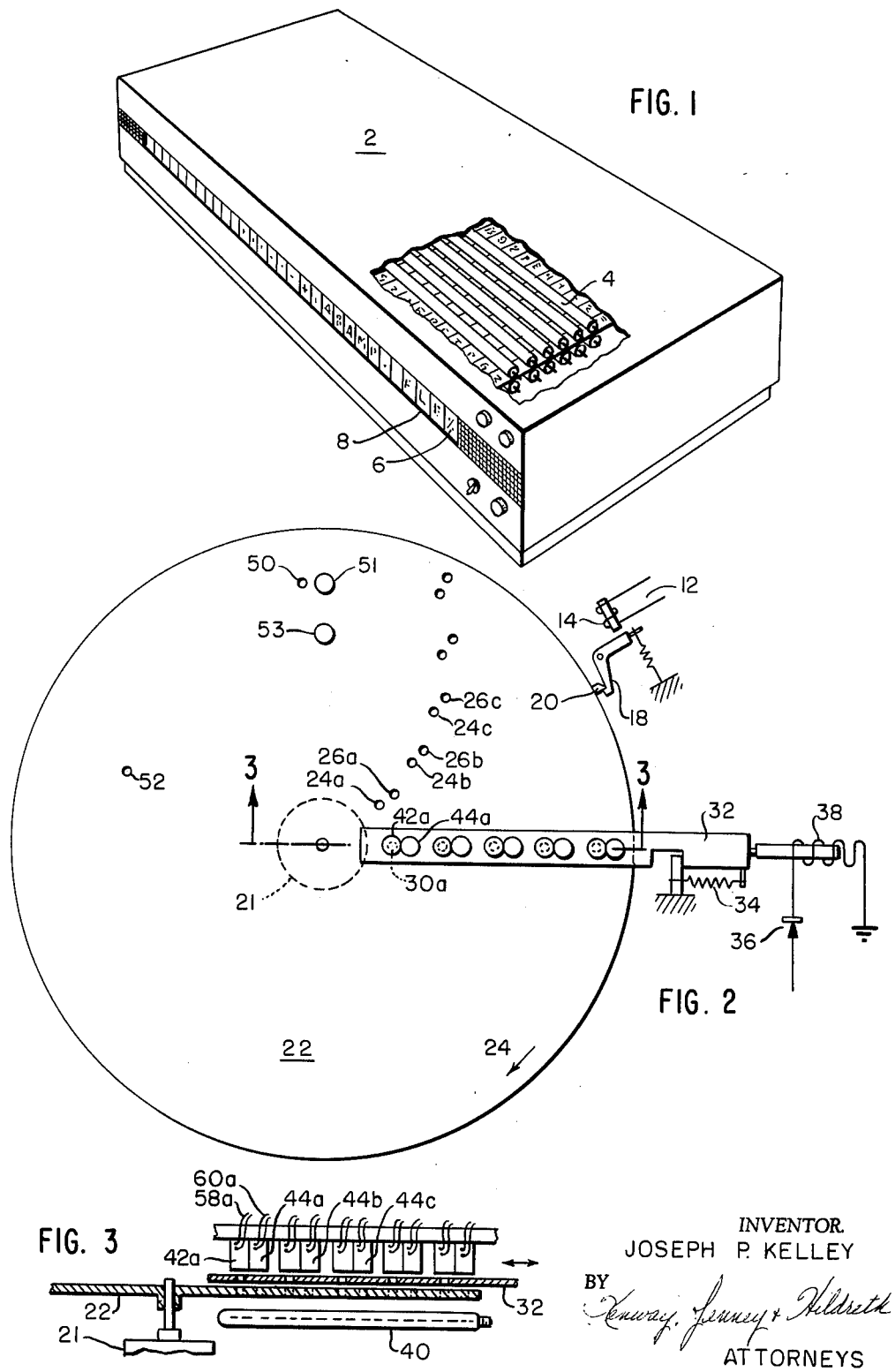

3,200,394
PLURAL BELT DISPLAY UNIT HAVING BALL DETENT CONTROL OF BELT POSITION
Joseph P. Kelley, Belmont, Mass., assignor to Air Technology Corporation, Cambridge, Mass., a corporation of Delaware
Filed July 25, 1962, Ser. No. 212,237
8 Claims. (Cl. 340—324)

This invention relates to display equipment and more particularly to equipment adapted to provide a visual display from coded information.

A wide variety of apparatus has been used in the past to provide visual displays. For large area, low resolution displays satisfactory performance has been achieved by means such as light bulbs which can be energized in varying combinations. While such devices are quite suited for showing the score at a ball game, for instance, they are not well adapted to display high quality high resolution information for use at remote locations. Commercial teletype equipment has provided for the remote display of information, but the teletype output is, of necessity, rather small in size. Therefore, a standard Teletype output requires relatively close attention for the information to be available to even one individual.

Accordingly, it is an object of the present invention to provide apparatus capable of displaying enlarged characters corresponding to information transmitted to remote locations.

A further object is to provide apparatus capable of displaying enlarged characters from information of the type transmitted on a regular Teletype transmission line.

Another object is the provision of apparatus for displaying information which is simple and reliable in construction.

A further object is to provide display apparatus which is inexpensive to produce.

These and other objects of the present invention are achieved in the structure in which the displayed characters are provided as indicia on moving belts. A further feature is the utilization of coded detent positions on the same belts so that the belt drive mechanism performs a decoding operation. The invention likewise involves the additional features set forth in the following specification and drawings wherein:

FIG. 1 is a cut-away perspective view of a display unit;

FIG. 2 is a schematic view of a detecting mechanism;

FIG. 3 is a cross-section view at section 3—3 of the detecting mechanism of FIG. 2;

FIG. 4 is a diagram of an electrical waveform of the character suitable for use with embodiments of the present invention;

FIG. 5 is a schematic diagram of decoding equipment suitable for use with the present invention;

FIG. 6 is a cross-section view of belt drive apparatus suitable for use with the present invention and positioned for a code input operation;

FIG. 7 is a perspective view of a detent-actuating slider suitable for use in the present invention;

FIG. 8 is a cross-section view of a belt drive bar;

FIG. 9 is a cross-section view of belt drive apparatus suitable for use with the present invention and positioned for a belt-drive operation;

FIG. 10 is a cross-section view of belt drive apparatus suitable for use with the present invention and positioned for a character display;

FIG. 11 is a plan view of a display belt suitable for use in the present invention;

FIG. 12 is a perspective view of a portion of a display unit according to the present invention;

FIG. 13 is a plan view of the face of another display belt suitable for use with the present invention;

FIG. 14 is a cross-section view of the display belt of FIG. 13;

FIG. 15 is a plan view of the back of the display belt of FIG. 13; and

FIG. 16 is a plan view of a ball-detent bar suitable for use with the belt of FIG. 13.

Referring now to FIG. 1, a cut-away perspective view of an overall message display unit is shown. The unit is housed within a cabinet 2. With this cabinet each of the belts 4 is provided with characters 6 on its face. These characters are displayed at a window 8 within the cabinet. There is one belt for each station or digit position of the display. The means whereby these display positions on the belts are determined involves the use of the coded message information to determine the position to which the indiviual belts are driven.

Referring now to FIG. 2, a schematic view of a mechanical signal detector and decoder is shown. The mechanical detector operates as follows. For simplicity it will be assumed that a conventional Teletype signal is being received. Such a signal conveys information by means of its polarity or amplitude during time intervals of predetermined length. It will be assumed that the signal being decoded conveys information by means of deviations from positive to negative polarity and that it is of the type shown as waveform 10 in FIG. 4. The incoming signal is supplied through line 12 to the detector release relay 14 of FIG. 2. The initial period 16 of the signal 10 provides time for the decoder start operation, and for initiation of the station transfer operation which will be described subsequently. The received signal on line 12 energizes detector release relay 14 and retracts the detector holding pawl 18, which has been in contact with detector stop 20. The detector wheel 22 is now free to rotate under the influence of motor 21 in the direction shown by arrow 24. The wheel 22 is provided with several pairs of holes 24 and 26. The wheel 22 is shown in FIG. 2 in its position before release. Therefore, the first pair of holes, 24a and 26a, are positioned at an angular position in advance of the detecting mechanism. By the time the portion 28 of the waveform 10 is being transmitted, the wheel will have rotated so that the holes 24a and 26a are in line with the windows 30. For a normal, slow speed Teletype system the time interval involved for this motion would be a 22 millisecond time period. The five apertures 30 are contained within a movable masking slide 32. As shown in FIG. 2, this slide 32 is held in its left hand position by spring 34. A positive pulse supplied by the incoming waveform 10 will pass through diode 36 and energize relay 38. This solenoid will move the slide 32 to the right so that the first aperture 30a is over hole 26a. In the left hand position as shown in FIG. 2, the aperture 30a is over hole 24a. Thus, the polarity of the input signal will determine which of two apertures is aligned with the corresponding hole in slide 32.

Referring now to FIG. 3, the provision of an output signal by this decoding operation may be seen more clearly. A lamp 40 is positioned behind the wheel 22 and in line with bar 32. Thus, when one of the holes 24 or 26 is aligned with a hole 30, light from lamp 40 will, in that particular location, pass through both the wheel 22 and the bar 32. This light will then impinge on one of the photocells 42 or 44. For the input waveform shown in FIG. 4, during the first portion of the signal received in time interval 28, the waveform is positive. Therefore, the solenoid 38 will have moved the bar 32 to its right hand position. Therefore, as the holes 24a and 26a come in line with the center line of the bar 32, light from the lamp 40 will pass only through hole 26a. This light will energize the solid state direct photoswitch 44a. Thus, a given polarity of the input signal has determined which of the two switches 42a and 44a will be closed. When the next portion of the waveform 10 is received, that portion within the time interval 46, the wheel 22 will have advanced still further. At that time, the next pair holes, 24b and 26b, will be positioned in line with the bar 32. This portion of the waveform is also positive so that except for this change in radial location, the decoding operation is exactly like that previously described for the area 28 of the waveform 10. That is, photoswitch 44b will be closed. During the next time interval 48, the third pair of holes 24c and 26c will be aligned with bar 32. During this portion of the waveform, the received signal is negative in polarity. Therefore, the solenoid 38 is not energized and the bar 32 remains in its left hand position. Thus, the window 30c will be over hole 24c and photoswitch 42a will be closed.

Thus, as the signal continues to be received and the wheel 22 continues to rotate, selected ones of subsequent pairs of switches 42 and 44 will be closed until the entire signal has been detected. With the conventional Teletype signal being utilized for purposes of illustration, the five successive pairs of holes with their associated switches will perform the detection of five binary bits of information.

The polarity of the incoming signal could be used to determine which of two lamps within a pair of lights would be energized. That is, one light of each pair would be associated with the radial position of a hole 24 and the other light would be associated with the radial position of a hole 26. Photoswitches, but no masking slide, would be aligned with the respective holes. The determination of which light was energized would determine which hole passed light to its associated switch, so that the end result would be exactly like that provided through the use of the moving slide. The movable slide 32 has been shown as a preferred embodiment since it provides a simple reliable mechanical structure and does not impose any response time limitations upon the lamp 40.

In addition to the pairs of holes described above, wheel 22 has two additional holes. The first of these, hole 50, passes light to photoswitch 51 immediately after the wheel 22 begins to rotate. Thus, photoswitch 51 provides a signal immediately after the start of each detection cycle. The other hole, hole 52, passes light to photoswitch 53 after the fifth pair of holes 24 and 26 has passed bar 22. Thus, photoswitch 53 provides a signal after the entire input signal has been detected. As will be more fully discussed hereinafter, these signals from photoswitches 51 and 53 are used in the decoding system.

Referring now to FIG. 5, a schematic diagram of a decoding system suitable for use with the mechanical detector of FIGS. 2 and 3 is shown. The mechanical detector is shown as block 54. The incoming signal is represented as the input on line 56. The detector 54 provides five pairs of outputs on line pairs 58 and 60. These output lines are the lines controlled, as described above, by photoswitch pairs 42 and 44. The output line pairs are connected to reversing clutch drives 62. These reversing clutches drive the input rollers 64. The direction in which the input rollers are driven depends on whether a line 58 or a line 60 has been energized for the associated reversing clutch drive 62. As will be more fully described hereinafter, the direction of roller rotation determines which of two locating positions on the display belt will be utilized.

The signals on output line pairs 58 and 60 are also fed to the decoder 66 through line pairs 68 and 70. Thus, the detected incoming signal provides binary inputs to decoder 66. Decoder 66, consisting of conventional binary decoding matrices, provides three outputs. If the input signal was information calling for "carriage return," that is the beginning of a new display line, a signal appears on line 72. If the input signal was an indication of a change from figures to letters, letters to figures, or the previously mentioned carriage return, a signal appears on line 74. This line energizes relay 76, which inhibits the "change-of-station" operation. That is, with these three inputs no advance to the next display position should be made. If relay 76 is not energized, the signal on line 90 will be fed to change-of-station control apparatus 92. The signal on line 90 is controlled by photoswitch 51. Therefore, unless inhibited by relay 76, a signal is fed to the change-of-station control apparatus 92 at the beginning of each detection cycle.

The other decoder output is on lines 78 and 80 to reversing clutch drive 82 which is associated with the figure-letter input roller 84. As with the character input rollers 64, the energization of line 78 or 80 determines the direction in which reversing drive 82 drives the roller 84.

Each of the output pairs 58 and 60, and the output pair 78 and 80 passes through a gate 86 controlled by line 88 from photoswitch 53. Thus, the reversing clutch drives 62 and the reversing clutch drive 82 do not start to operate until photoswitch 53 is energized.

Referring now to FIG. 6, the means by which the code input is set into the display mechanism is shown. Each of the character input rollers 64 has been placed in contact with a slider 94. These sliders are free to move for a limited distance within bar 96 which is pivoted at point 98. For the code input operation being shown, a spring 100 has lowered the bar so that the sliders 94 are in engagement with the input rollers 64. As shown in FIG. 6 each of the sliders 94 is associated with a pair of ball detents 102 and 104.

As shown in FIG. 7, each of the sliders 94 has a roller engaging section 106, and two raised portions 108 and 110. The raised portions 108 and 110 are of greater width than the remainder of the slider. Thus, the slider is keyed into but free to slide transversely in the bar 96. Between the two raised portions there is a lowered section 112. The limited transverse movement in accordance to the rotational input from the roller 64 results in the positioning of a raised portion 108 or 110 under ball detent 102 or 104, respectively, as shown in FIG. 8. The unraised ball detent is free to recede into the recess 112. The operation of roller 84 positions ball detent 103 or 105 in a similar manner. The slider is coated with a substance such as foam neoprene 114 to provide good engagement with the rollers 64 and yet allow the slippage necessary when the end of the desired travel has been reached. The dimensions of the bar of FIG. 8 are such that two ball detents 102 and 104 are used to provide proper spacing. With a thinner cross-section, single ball detents would suffice.

Referring now to FIG. 9, the positioning during belt drive is shown. As discussed above, each of the code input rollers 64 has been properly rotated to position the ball detents in accordance with the received character input code. The next character input transmission produces a signal on line 90. As discussed above in conjunction with FIG. 5, this signal is fed to the station transfer control apparatus 92. This input to the station transfer control apparatus 92 energizes the cog motor 117 for the display cog 116, of the next station. This cog 116 is rotated to bring one of its projections 120 under flat spring 122. The force applied to this spring exceeds that provided by spring 100 so that the arm 96 is raised to bring the ball detents 102 and 104 in contact with the belt 4. A stop bar 123, positioned slightly lower than rollers 124, presses against belt 4 to limit the raising of arm 96. Opposite each of the ball detent pairs a belt drive roller 124 is provided. As long as the belt has not progressed to a point where a recess is located opposite each ball detent, there will be sufficient pressure between the ball detent and a drive roller 124 to provide traction sufficient to move the belt.

As shown in FIG. 10, when the desired character has reached the display window 8, each of the ball detents will be opposite a detent recess 125 in the belt 4. The release of the ball detents in ball detent recesses permits the release of driving engagement from each of the rollers 124. In addition, the simultaneous presence of a ball detent in each detent recess 126 means that the belt is maintained in a steady position with the desired character 6 appearing at window 8. The stop bar 123 prevents the arm 96 from rising further to cause driving engagement in the absence of unreleased ball detents.

Referring now to FIG. 11, a plan view of the back of a display belt 4 is shown. The characters appear on the face of the belt. On the back, there are the ball detent recesses 126. These detent positions are equally spaced along two longitudinal lines 128 and 130 located at different transverse positions on the belt. At each longitudinal recess position a ball detent recess will occur in either line 128 or line 130. The ball detent recesses 134 for the figure-letter indication provided by ball detents 103 and 105 are located along the same lines but in an intermediate position. The character coding is simplified if the recesses 134 are positioned at some point other than midway between recesses 126. For example, if the recesses 126 are spaced every three-quarters of an inch, the recesses 134 may be one-quarter of an inch further along the belt. With such an arrangement a unit distance code in cyclic form may conveniently be used. In these codes one recess, or ball detent, position is changed for each successive character. The two lines 128 and 130 along the belt in which the ball detent positions lie correspond with the transverse positioning of ball detents 102 and 104, respectively.

As described above, the overall position indication is provided by the combination of one ball detent recess 134 and five ball detent recesses 126. These recesses are so positioned along the belt that there is a unique combination of recesses associated with each character. The particular recesses associated with a given character 6 will normally be located on a section of the belt which does not include the character to be displayed. Referring to FIG. 12, for example, it will be seen that the ball detent bar 96, and therefore the coded recesses associated with a particular character are located a predetermined distance away from the display window 8 so that when the ball detents arrive at the desired position the desired character 6 is at the display window 8.

It is possible to have more than two rows of detent recesses. In that case, additional ball detents are provided in positions which are in alignment with the additional rows of detent recesses. Alternatively, a belt with shaped edges may be used. As shown in FIGS. 13, 14 and 15, a belt has been provided with bevelled edges. For half the length of the belt a bevel is on one side, while the other half of the length has the bevel on the other side. The relief provided by the bevelled portions 136 and 138 is functionally equivalent to the relief provided by a detent recess. FIG. 16 shows a ball detent bar suitable for use with a belt of the type shown in FIG. 15. In FIG. 16, the ball detent pairs 102 and 104 align with the detent recesses 126 on the belt 4. The additional ball detents 103 and 105 align with the bevelled sections 136 and 138, respectively. With a belt arrangement as shown in the embodiment of FIG. 15, all of the figures will be contiguous in one section of the belt and all of the letters will be contiguous in the remainder of the belt.

The above description sets forth specific embodiments suitable for the practice of the present invention in the visual display of characters in accordance with a coded transmission. The logical sequence of operation may be summarized as follows. It will be assumed that the embodiment is utilizing a standard Teletype transmission having a wave form 10 of the type shown in FIG. 4. The beginning of a transmission is indicated by a sudden drop in potential at region 16. In conventional Teletype equipment this drop in potential causes a set of contacts to be clutched to a rotating shaft. While conventional Teletype detecting equipment could be used with the present invention, the apparatus discussed above in conjunction with FIGS. 2 and 3 provides a simple and preferred detecting system.

Operation of the display apparatus once detection begins will be as follows. It will be assumed that the letter "J" is being transmitted. At the beginning of the transmission, the detecting wheel 22 will be released and immediately thereafter hole 50 will admit light to photoswitch 51. Line 90 from photoswitch 51 will activate the change of station transfer control apparatus 92. The station transfer control apparatus 92 will activate the cog motor 117 of the next display cog 116 so that the proper projection 120 is moved into position to elevate the next ball detent arm 96. The ball detent pairs 102 and 104 will have been set to the desired positions during the preceding transmission. Therefore, while the present transmission of the letter "J" is being received, the selected belt begins to be driven to the previously transmitted character. While the station selection circuitry is not shown, it can consist of conventional switching circuitry. For example, a ring counter will provide the succession of station control outputs for the cog motors 117 under the influence of successive inputs over line 90 in FIG. 5. An input over carriage return line 72 will reset the ring counter to its starting position and thus begin a new line of displayed characters.

Since a "J" is being transmitted, the received waveform of the conventional Teletype code corresponds with that shown by the solid line 10 in FIG. 4. This waveform has no influence whatsoever on the characters now being displayed and the belt now moving to the proper display position. All display operations now taking place have been determined by previous character transmissions.

When region 140 of waveform 10 is passed, the information requesting the selection and display of the character "J" will have been detected. The first, second and third character rollers will have lines 60 energized to drive their reversing drive clutches in one direction. The third and fifth character input rollers 64 will have lines 58 energized. When region 140 has been passed, hole 27 will produce a signal on line 88 which controls the gates 86. With the gates 86 energized, the character input rollers 64 will begin to rotate and will position the ball detents 102 and 104 as previously described in conjunction with FIG. 6. The letter "J" will not be displayed however until the next character transmission begins. At that point the cycle will repeat itself, the arm 96 for the next character display position will be raised, and the pressure from belt drive rollers 124 will begin to drive the letter "J" on the associated belt to the window 8 of the character display apparatus.

Assume now that the code to indicate a change from figures to letters, a change from letters to figures, or a carriage return is being transmitted. No display is appropriate in connection with this transmission. Therefore, the decoder 66 will provide an inhibiting output on line 74. The signal over line 74 will cause relay 76 to open and block the next transmission to the station transfer control apparatus 92. No cog motor 117 will be energized during the following transmission. At the end of the five character code bits the pulse on line 78 or 80 will pass through gate 86 in FIG. 5 to cause reversing drive 82 to drive the figure character roller 84 in the proper direction. While rollers 64 will also be driven, no use will be made of the ball detent positioning by these rollers.

Now assume a letter "J" is being transmitted after and above transmission of a figure-letter code indicating that letters follow. At the beginning of the code bits for the letter "J" no new display will be made because the previously transmitted inhibit pulse over line 74 will inhibit the station transfer operation and the resultant belt drive operation for one transmission cycle. That is, no cog motor 117 will operate to cause a projection 120 to raise an arm 96. The use of this inhibit technique means that it is never necessary to remove code inputs since the belt drive operation is only operative after desired inputs. Thus, a desired code input has always been inserted before an arm 96 is raised for the belt drive operation.

While the operation has been described assuming a station shift to one new position each time with a resulting serial display of new characters, this mode of operation is not the only possible form. If desired, the code inputs could be applied to individual arms separately and then the entire new message displayed at once by raising all arms 96 and thus engaging all belt drives simultaneously. Or individual predetermined character displays can be changed without affecting the remainder of the display if the appropriate ball detent arm 96 is manipulated.

With the simple form of Teletype transmission utilized for the above embodiment, the decoding can be done directly by utilizing the binary signals to energize the five reversing drive clutches. However, the present invention is not limited to any particular decoding system. Those skilled in the display and mechanical arts will recognize that many signal transmission and decoding systems may be utilized with display apparatus according to the present invention. While a preferred embodiment has been utilized to describe the invention, the embodiment is illustrative only and does not serve to limit the invention. Those skilled in the art will recognize that modifications can be made in the apparatus utilizing character-signal positioned means to drive the display indicia bearing member to a desired position without departing from the scope of the present invention.

Having thus described my invention, I claim:

1. Display apparatus comprising a belt bearing indicia indicative of desired characters, said belt being provided with a plurality of recesses, distinct groups of said recesses bearing a predetermined spatial relationship to said characters, driving means for said belt, a plurality of ball detents for each of said belts to urge said belts into contact with said driving means, means to raise individual ones of said ball detents into contact with said belt, and means to raise predetermined combinations of said ball detents whereby said belt is driven to a position whereby each of said raised ball detents engages a recess of one of said recess groups thereby displaying the character associated with the corresponding recess group in said belt.

2. Display apparatus comprising a member bearing indicia indicative of desired characters, said member being provided with a plurality of recesses, distinct groups of said recesses bearing a predetermined spatial relationship to said characters, driving means for said belt, a plurality of ball detents for each of said members to urge said members into contact with said driving means to raise individual ones of said ball detents into contact with said member, and means to raise a predetermined combination of said ball detents whereby said member is driven to a position at which each of said raised ball detents engages a recess of one of said recess groups whereby the contact of said driving means with said member is released thereby displaying the character associated with said recess configuration in said member.

3. A display system comprising a plurality of belts bearing indicia indicative of desired characters, each of said belts being provided with a plurality of recesses, distinct groups of said recesses bearing a predetermined spatial relationship to said characters, driving means for each of said belts, a plurality of ball detents for each of said belts to urge said belts into contact with said driving means, means to raise individual ones of said ball detents into contact with said belts, and means to raise predetermined combinations of said ball detents within each plurality of ball detents, whereby each of said belts is driven to a position at which each of said raised ball detents engages a recess of one of said recess groups thereby releasing said driving means from driving contact with said belt and displaying the character associated with the predetermined recess configuration in said belt.

4. A display system comprising a plurality of belts bearing indicia indicative of desired characters, each of said belts being provided with a plurality of recesses, distinct groups of said recesses bearing a predetermined spatial relationship to said characters, driving means for each of said belts, a plurality of ball detents for each of said belts, each plurality of said ball detents being contained within an arm, means to raise predetermined combinations of said ball detents within an arm, and means to raise said arms to place said raised ball detents in contact with said belts, whereby said belts are placed in contact with said driving means and each of said belts is driven to a position at which each of said raised ball detents engages a recess of one of said recess groups thereby releasing said driving means from driving contact with said belt and displaying the character associated with the predetermined recess configuration in said belt.

5. A display system comprising a plurality of members bearing indicia indicative of desired characters, each of said members being provided with a plurality of recesses, each of said recesses being located in one of two possible positions, said locations being arranged in a unit distance cyclic code, distinct groups of said recesses bearing a predetermined spatial relationship to said characters, driving means for each of said members, a plurality of ball detents for each of said members, said ball detents being arranged in pairs, each plurality of ball detents being contained within an arm, means to raise one ball detent in each of said ball detent pairs, and means to raise said arms to place said raised ball detents in contact with said members, whereby said members are placed in contact with said driving means and each of said members is driven to a position at which each of said raised ball detents engages a recess of one of said recess groups thereby releasing said driving means from driving contact with said belt and displaying the character associated with the predetermined recess configuration in said belt.

6. A display system for displaying characters in accordance with a received signal comprising a plurality of belts bearing indicia indicative of desired characters, each of said belts being provided with a plurality of recesses, each of said recesses being located on one of two spaced apart lengthwise axes on said belt, said locations being arranged in a unit distance cyclic code, distinct groups of said recesses bearing a predetermined spatial relationship to said characters, driving means for each of said belts, a plurality of ball detents for each of said belts, said ball detents being arranged in pairs, each plurality of ball detents being contained within an arm, means to decode said received signal, means to provide binary control signals corresponding to said decoded signal, means to raise one ball detent in each of said ball detent pairs in accordance with said control signals, and means to raise said arms to place said raised ball detents in contact with said belts, whereby said belts are placed in contact with said driving means and each of said belts is driven to a position whereby each of said raised ball detents engages one of said recesses thereby displaying a character in accordance with said received signal.

7. A display system for displaying characters in accordance with a received signal comprising means to decode said received signal, means to provide binary control signals corresponding to said decoded signal, means to provide control pulses from said control signals, a plurality of belts bearing indicia indicative of desired characters, each of said belts being provided with a plurality of recesses, each of said recesses being located on one of two spaced apart lengthwise axes on said belt, said locations being arranged in a unit distance cyclic code, distinct groups of said recesses bearing a predetermined spatial relationship to said characters, driving means for each of said belts, a plurality of ball detents for each of said belts, said ball detents being arranged in pairs, each plurality of ball detents being contained within an arm, means to raise one ball detent in each of said ball detent pairs in accordance with said control signals, and means to raise each of said arms to place said raised ball detents in contact with said belts, said raising means being controlled by said control pulses, whereby said belts are placed in contact with said driving means and selected ones of said belts are driven to positions whereby each of said raised ball detents engages one of said recesses thereby displaying a character in accordance with said received signal.

8. A display system for displaying characters in accordance with a received signal comprising a plurality of belts bearing first and second groups of indicia indicative of desired characters, each of said belts being provided with a plurality of recesses, each of said recesses being located on one of two spaced apart lengthwise axes on said belt, said locations being arranged in a unit distance cyclic code, distinct groups of said recesses bearing a predetermined spatial relationship to said characters, first and second extended relieved portions of said belt, each of said relieved portions being located on a lengthwise axes of said belt and corresponding to one of said first and second groups of indicia, driving means for each of said belts, a plurality of ball detents for each of said belts, a first group of said ball detents for each belt being arranged in pairs, a second group of ball detents for each belt being arranged in a pair, each plurality of ball detents being contained within an arm, means to decode said received signal, means to provide binary control signals corresponding to said decoded signal, means to raise one ball detent in each of said ball detent pairs in accordance with said control signals, and means to raise said arms to place said raised ball detents in contact with said belts, whereby said belts are placed in contact with said driving means and each of said belts is driven to a position whereby each of said first group of raised ball detents engages one of said recesses and each of said second group of raised ball detents engages an extended relieved portion thereby displaying a character in accordance with said received signal.

References Cited by the Examiner

UNITED STATES PATENTS

| | | | |
|---|---|---|---|
| 2,885,475 | 5/59 | Canepa | 340—316 |
| 2,896,845 | 7/59 | Hansen et al. | 340—325 X |
| 3,047,852 | 7/62 | Smith | 340—324 |

NEIL C. READ, *Primary Examiner.*